Sept. 11, 1956 G. E. HORVATH 2,762,640
PACKING RINGS
Filed Sept. 10, 1952

Inventor
Guy E. Horvath
by: Gary, Desmond & Parker
Attys.

United States Patent Office 2,762,640
Patented Sept. 11, 1956

2,762,640
PACKING RINGS

Guy E. Horvath, Manheim, Pa., assignor to Raybestos-Manhattan, Inc., Passaic, N. J., a corporation of New Jersey Application September 10, 1952, Serial No. 308,832

2 Claims. (Cl. 288—18)

This invention relates to improvements in packing for pumps and other relatively movable mechanisms, and refers particularly to a molded packing for such mechanism.

In many packings heretofore proposed the application of the gland pressure to the packing is extremely critical. In many so-called V-type packings, the packings must be taken up lightly or just finger tight. This means that much depends upon the skill and experience of the operator since excessive take-up will cause high friction on the moving part. In large equipment, nuts cannot be tightened sensitively and, therefore, under or over adjustment often results.

In the packing comprising my invention a portion of the packing removed from the packed moving part, that is, the piston rod in the case of a pump, absorbs the gland pressure without excessively pressurizing or distorting the lip portion of the packing, that is, that portion which contacts the moving part. This permits an inexperienced or unskilled operator to apply the gland pressure since all that is necessary is to apply a tight take-up pressure.

As another feature of the invention because of the shape of the packing units no adapters of any type are required either molded or machined. To provide a flat top surface to engage the flat gland surface it is merely necessary to slice off a portion of the upper packing unit and for the bottom the flat bottom portion of the packing unit is sufficient for contact.

As another feature of my invention, because of the relatively high gland pressure which may be used with my unit packing rings, the rings are prevented from rolling or inverting as in the case with ordinary V rings which must be maintained under relatively light gland pressure. In addition, because of the relatively loose condition of the packing rings in the stuffing box, axial movement has heretofore taken place resulting in excessive wear on those surfaces of the ring removed from the moving part. This is particularly true since the stuffing box surface is normally not finished to a polished surface and acts to abrade the packing.

Other objects and advantages of my invention will be apparent from the accompanying drawing and following detailed description.

In the drawing, Fig. 1 is a diagrammatic sectional view of a stuffing box illustrating the use of my improved packing.

Figure 1:
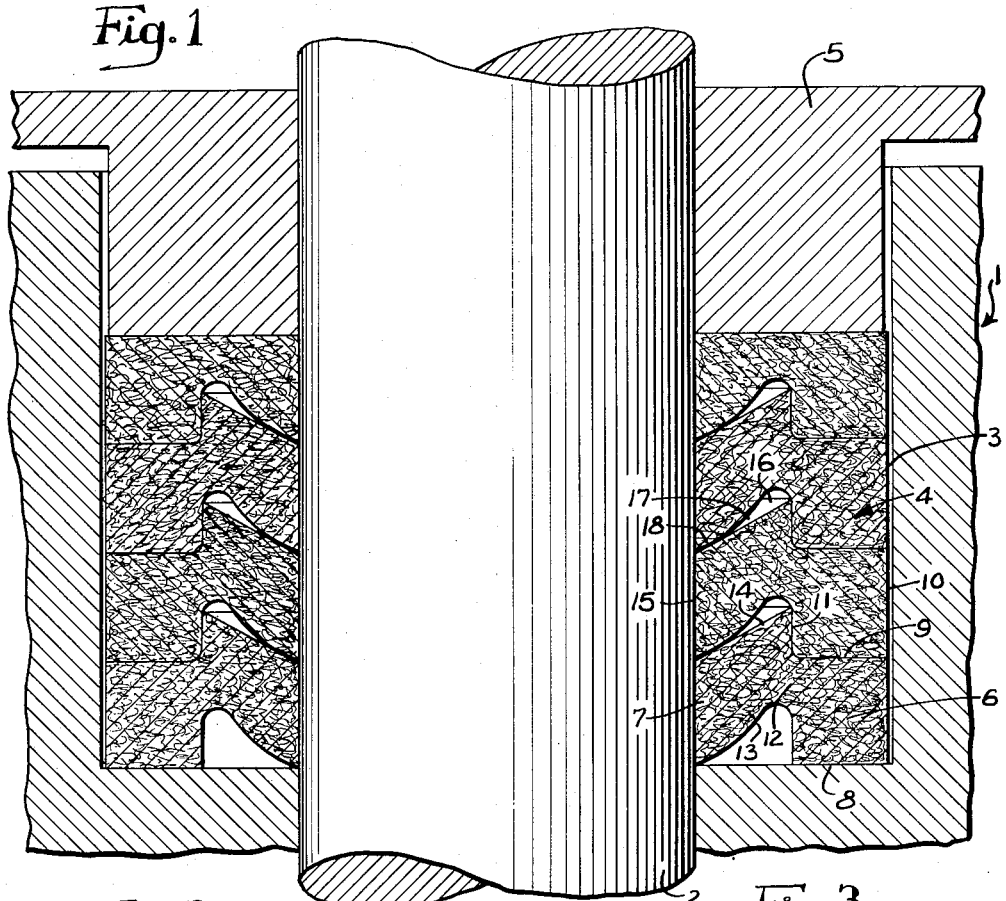

Referring in detail to the drawing, 1 indicates a stuffing box through which a rod 2 moves axially. The rod 2 may be a piston rod or the like along the surface of which, it is desired that, leakage be prevented. The stuffing box 1 is provided with a cavity 3 which is adapted to contain one or more packing rings 4. 5 indicates a packing gland which is adapted to exert pressure upon the rings 4 in a direction parallel to the axis of shaft 2.

The essence of my invention resides in the packing rings 4 which may be constructed either as endless rings or as split rings, and may be constructed of rubber or rubber-like materials, plastics or the like, or the materials hereinbefore mentioned, if not used in homogeneous form, may be reinforced with duck, asbestos fibre, cloth or the like.

The important feature of the rings 4 resides in their conformation, and for purposes of description, each ring may be considered as being constituted of two parts, namely, the heel portion or section 6 and the finger portion or section 7. The heel portion is annular and is of substantially rectangular cross-section, having a relatively flat bottom 8 and a relatively flat top 9 with an annular outer periphery 10 and an annular inner shoulder 11 which is substantially parallel to the other periphery 10 but is of shorter height than the outer peripheral wall.

It can readily be seen that when the rings 4 are stacked one upon the other in the stuffing box cavity 3, the lower surface 8 of one ring lies in plane-parallel contacting relationship to the upper surface 9 of the next lower ring. Hence, pressure exerted parallel to the axis of the rod 2 by the gland 5 is sustained primarily by the heel sections 6 of the rings.

The finger portion 7 of each ring is integrally connected to the heel portion 6 by means of an annular neck 12 of reduced thickness and the lower surface of each finger portion is defined by a curved or warped surface 13. By the provision of the portion 12 of reduced thickness the finger portion can hinge in resilient fashion about the heel portion. A shoulder portion of the finger section of a lower ring extends upwardly from the neck portion 12 and is adapted to lie in plane-parallel contacting relationship with the shoulder portion 11 of the heel section of the ring. The upper surface of the finger portion 7 of each ring is defined by an angularly inclined annular surface 14 which is adapted to lie beneath the warped surface 13 of the adjacent upper ring, when the rings are stacked. The inner surface of the finger portion 7 comprises an annular surface 15 which is adapted to lie in plane-parallel contacting relationship with the surface of the rod 2.

As has been hereinbefore described, the pressure of the packing gland is essentially sustained by the heel sections 6. However, inasmuch as the rings are constructed of a resilient, distortable material the heel sections tend to flatten. In view of the fact that the material comprising the rings is substantially incompressible, if no clearance space were provided in the cavity 3 the pressure of the gland would establish a pressure which would be essentially hydrostatic, that is, it would be transmitted substantially undiminished in all directions. This condition would defeat my purpose since gland pressure would then be transmitted substantially undiminished normal to the shaft 2.

In addition, it will be noted that the annular curved surfaces 13 are substantially tangential to the respective adjacent conical surfaces 14 when gland pressure is applied and thus the component of the gland pressure resolved normal to the rod may be partially controlled by the magnitude of the angles 17 which the annular surfaces 13 make with the respective conical surfaces 14 and also the angles which the conical surfaces 14 make with the surface of the rod 2. Further, the variation of the angle 18 which the inclined surface 14 makes with the rod may also be employed to partially control the relationship of the gland pressure to the finger pressure normal to the rod 2.

As an example of a packing ring which has been found suitable, the ring may be proportioned so as to have the radial thickness of the heel section 6 substantially equal to the radial thickness of the finger section; the axial length of the peripheral side 10 is substantially equal to the axial length of the inner side 15; and with an overall radial thickness of the packing of unit, the overall axial height of the ring 8 is about .822; and the angle 18 is in the neighborhood of 61 degrees.

Of course, it is not intended that the above specific example be considered a limitation of my invention since it is merely set forth as one of numerous forms which my packing ring may take.

Figure 2:
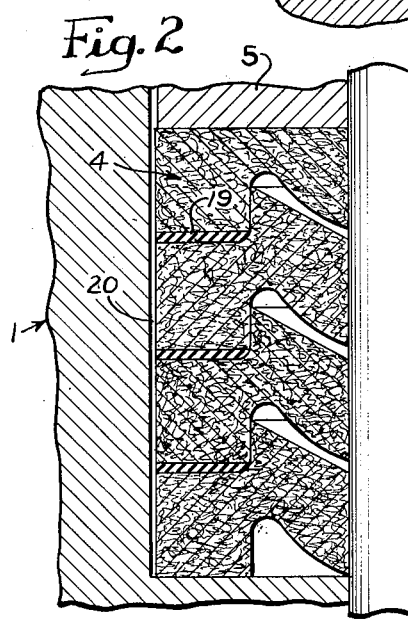
Fig. 2 is a fragmentary view, similar to Fig. 1, illustrating the use of soft pliable rings interposed between the packing rings before gland pressure is applied.
Figure 3:
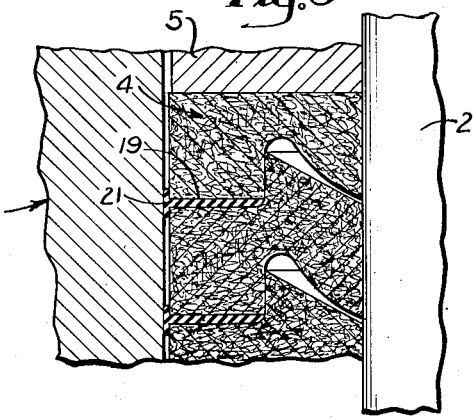
Fig. 3 is a view similar to Fig. 2 illustrating said soft interposed rings after gland pressure has been applied.

As set forth in my copending application for patent, Serial No. 308,833, filed September 10, 1952, and entitled Seal for Packing Rings in a Stuffing Box, relatively soft, pliable rings 19 (Figs. 2 and 3) may be employed where it is desired to use undersized packing rings. The packing ring comprising my present invention is particularly suitable for employing such soft, pliable rings.

In utilizing my improved packing rings 4 with the interposed soft rings 19, the outer diameter of the rings 4 may be made less than the inner diameter of the stuffing box cavity to provide a small clearance 20. This greatly facilitates the installation of the packing rings. When gland pressure is applied, the soft rings 19 are squeezed or extruded outwardly into sealing contact with the stuffing box wall, as shown best at 21 in Fig. 3. The extruded portion thus seals off the clearance space 20 compensating for the undersized packing rings.

My improved packing rings 4 are ideally adapted for use with such soft ring 19 since the contact of the wall 11 of the heel portion with the abutting shoulder of the finger portion tends to block flow of the soft material comprising rings 19 and compels extrusion of said rings to take place only in a radially outwardly direction where it will function as a seal. Hence, my improved packing rings 4, in addition to possessing the advantages hereinbefore pointed out, are adaptable for use with extrudible soft rings to permit the use of undersized packing rings.

It is not necessary to employ adapters at the upper and lower portions of a stack of rings 4, since the unaltered ring may be used as the lowermost ring of a stack and it is merely necessary to slice off the triangular sectioned portion of the finger section 7 in order to provide a flat surfaced top ring of the stack.

Although my invention has been shown and described in a packing ring wherein the element to be packed moves within the rings, it is to be understood that my packing rings can be employed with equal advantage where the moving element may carry the rings as, for instance, as piston rings on inside packed pistons.

I claim as my invention:

1. A packing ring constructed of relatively resilient material comprising an annular heel section and an integrally connected annular finger section, said heel section having a substantially rectangular cross section, said finger section having an annular side extending at substantially right angles to a side of said heel section, and an adjacent conical annular side inclined to said first mentioned side and a warped annular side opposite said conical inclined side and generally parallel to said inclined side, said finger section being radially and axially offset from said heel section, and said heel section and said finger section having substantially equal axial thicknesses at their respective outer and inner radial extremities, said ring adjacent the connection between the finger section and heel section being of reduced axial thickness.

2. A stack of packing rings for confinement in a stuffing box for packing a member movable in said stuffing box, said stack of packing rings comprising a plurality of axially stacked annular rings each having a heel portion of substantially rectangular section disposed in superimposed contacting relationship and being adapted to be radially spaced from said movable member, each ring having a finger portion integrally connected to a respective heel portion, the finger portion of each ring being radially and axially offset from the respective heel portion of said ring, each of the finger portions having an annular conical side inclined to the axis of said stack, and a warped side disposed oppositely to each inclined side, the warped side of one finger portion overlying and contacting the inclined conical side of an adjacent finger portion of an adjacent ring along spaced lines whereby an enclosed space is provided between each inclined conical side and the warped side of adjacent finger portions, the axial thickness of each finger portion defining one radial extremity of each ring adapted to contact the movable member being substantially equal to the axial thickness of the respective heel portion defining the opposite radial extremity of said ring, and the finger portions of the rings at said one radial extremity being in axial superimposed contact with each other to provide a substantially unbroken sealing surface for contact with the movable member.

References Cited in the file of this patent

UNITED STATES PATENTS

| 1,246,089 | Greenoe | Nov. 13, 1917 |
| 1,617,952 | Judd | Feb. 15, 1927 |
| 1,712,003 | Hubbard | May 7, 1929 |
| 1,992,967 | Roy | Mar. 5, 1935 |
| 2,264,147 | Dunlevy | Nov. 25, 1941 |
| 2,476,324 | Reich | July 19, 1949 |
| 2,686,092 | Neesen | Aug. 10, 1954 |

FOREIGN PATENTS

| 1,000,069 | France | Oct. 10, 1951 |